United States Patent [19]

Emmert et al.

[11] 4,265,208
[45] May 5, 1981

[54] CLOSED LOOP AIR-FUEL RATIO CONTROLLER WITH AIR BLEED CONTROL

[75] Inventors: Philip H. Emmert, Sterling Heights; Richard A. Stevens, Union Lake; Glenn A. Walkush, Flint, all of Mich.

[73] Assignee: General Motors Corporation, Detroit, Mich.

[21] Appl. No.: 39,330

[22] Filed: May 16, 1979

[51] Int. Cl.³ .............................................. F02M 7/00
[52] U.S. Cl. .................................................... 123/440
[58] Field of Search .................... 123/119 EC, 32 EA; 60/276, 285

[56] References Cited

U.S. PATENT DOCUMENTS

| | | | |
|---|---|---|---|
| 3,861,366 | 1/1975 | Masaki et al. | 123/119 EC |
| 4,057,042 | 11/1977 | Aono | 60/285 |
| 4,065,920 | 1/1978 | Minami et al. | 123/119 EC |
| 4,075,834 | 2/1978 | Saito | 60/276 |
| 4,150,645 | 4/1979 | Berent | 123/119 EA |
| 4,153,021 | 5/1979 | Hattori et al. | 123/32 EA |
| 4,156,413 | 5/1979 | Taplin | 123/32 EA |
| 4,163,433 | 8/1979 | Fujishiro | 123/119 EC |
| 4,167,924 | 9/1979 | Carlson et al. | 123/119 EC |

*Primary Examiner*—Charles J. Myhre
*Assistant Examiner*—R. A. Nelli
*Attorney, Agent, or Firm*—Howard N. Conkey

[57] ABSTRACT

A closed loop air-fuel ratio controller adjusts the air and fuel ratio of the mixture supplied by a carburetor to an internal combustion engine to a predetermined ratio in response to sensed exhaust gas oxidizing-reducing conditions. An air valve is energized to bleed air into the air-fuel mixture upstream of the exhaust gas sensor and independent of the mixture supplied by the carburetor when the carburetor idle fuel system is functioning and the magnitude of the adjustment in the mixture leaning direction reaches a predetermined value in response to a sensed rich air-fuel ratio to effect a decrease in the amount of the adjustment in the lean direction. The air bleed effectively increases the lean adjustment authority of the air-fuel ratio controller and avoids a lean air-fuel ratio excursion as the carburetor operation shifts from its idle fuel circuit to its main fuel metering circuit during cold engine operation.

3 Claims, 6 Drawing Figures

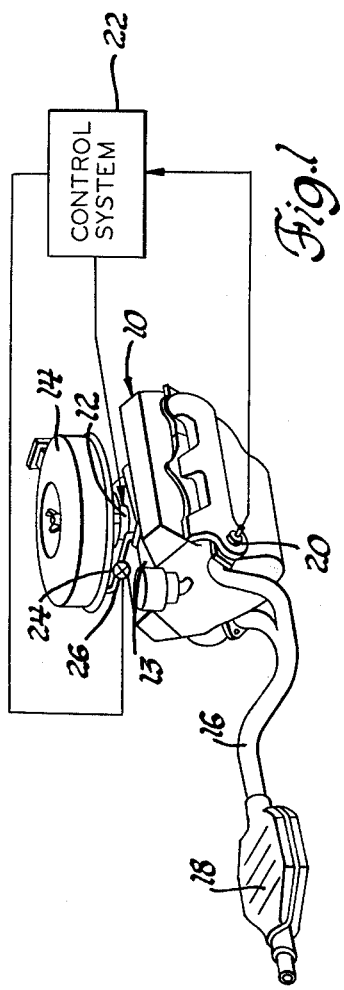
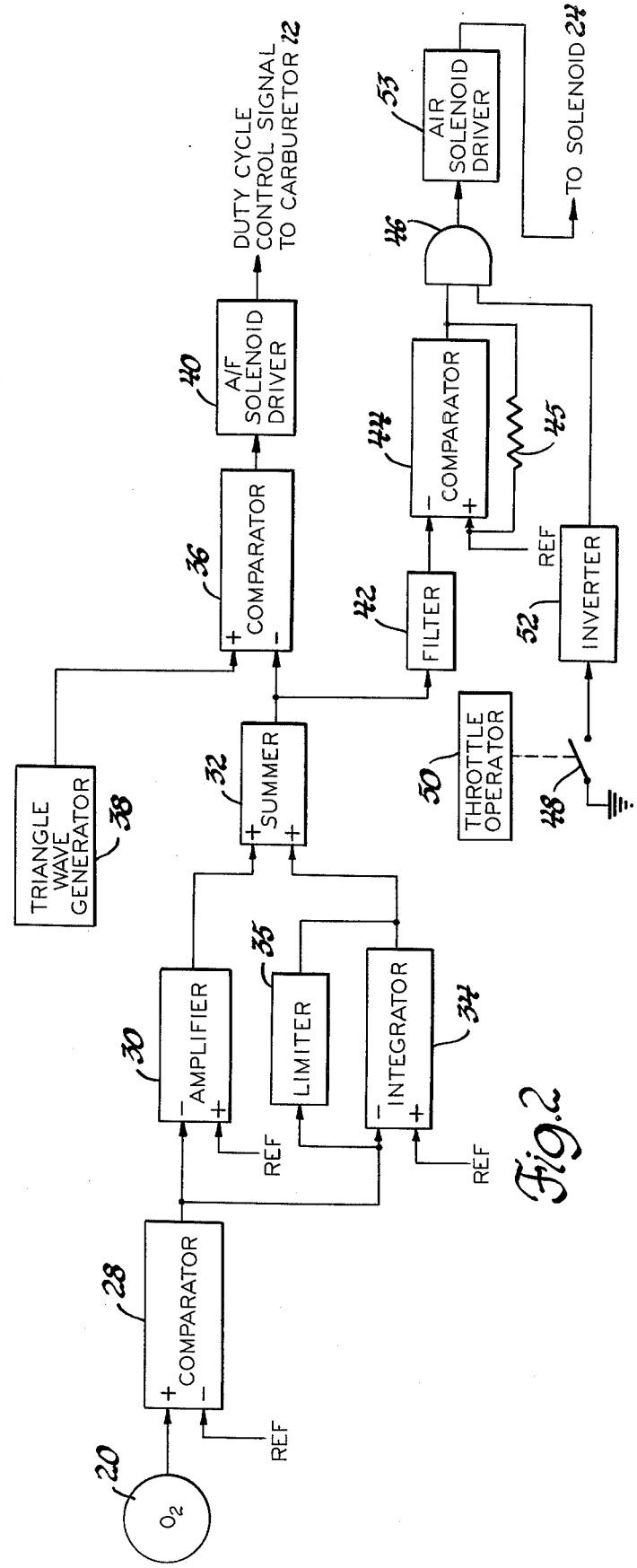

CLOSED LOOP AIR-FUEL RATIO CONTROLLER WITH AIR BLEED CONTROL

This invention relates to a closed loop air-fuel ratio controller for use with an internal combustion engine.

Several closed loop air and fuel ratio controllers have been proposed for use in an internal combustion engine for adjusting the mixture of the fuel and air to obtain a predetermined ratio, such as stoichiometry, in response to sensed oxidizing-reducing conditions in the engine exhaust gases. Typically these controllers individually or in conjunction with the air-fuel mixture forming assembly are limited in the amount of adjustment capability in both the lean and rich directions. For example, a controller may effect a maximum adjustment of four air-fuel ratios. This adjustment band is typically referred to as the adjustment authority of the control system.

Generally, the adjustment authority of a closed loop controller is adequate to control the air-fuel ratio to the desired value under most operating conditions of the engine. However, some air-fuel mixture forming assemblies have characteristics such that during certain operating conditions they provide substantially rich air-fuel ratios. In response to the sensed rich condition, the controller adjusts the mixture forming assembly in the lean direction and may, under extreme conditions, reach its authority limit in the mixture leaning direction. Once the authority limit is attained, the controller is incapable of closed loop operation to adjust the mixture to the desired air-fuel ratio. For example, if the air-fuel mixture forming assembly takes the form of a carburetor having idle and main fuel metering circuits, the idle circuit may typically supply a rich air-fuel mixture to the engine during cold engine operating conditions. During these conditions, the closed loop controller adjusts the carburetor in the lean direction and may under some circumstances approach the lean authority limit of the controller and carburetor.

In order to prevent the controller from reaching the lean authority limit and thereby lose closed loop control, this invention provides for an air bleed into the air and fuel mixture upstream from the exhaust gas sensor and independent of the fuel and air mixture forming assembly, such as the carburetor, so as to increase the air-fuel ratio that is sensed by the exhaust gas sensor. The closed loop controller responds to the sensed increase in the air-fuel ratio to reduce the amount of adjustment of the air-fuel ratio in the lean direction to thereby prevent operation at the lean adjustment authority limit and effectively increase the adjustment authority of the controller in the mixture leaning direction.

Additionally, the idle fuel circuit in a carburetor may typically provide a mixture during cold engine operation that is substantially richer than the mixture supplied by the main fuel metering circuit. Consequently, the magnitude of the closed loop adjustment in the lean direction during operation of the idle fuel circuit to obtain a predetermined air-fuel ratio is substantially greater than required during operation of the main fuel metering circuit. Therefore, when operation of the carburetor shifts from idle to part-throttle, a substantially lean mixture is provided by the main fuel metering circuit as a result of the value of the closed loop adjustment at that time and until the controller again adjusts the air-fuel ratio to the predetermined value. This lean air-fuel ratio excursion may result in undesirable engine performance.

The air bleed of this invention also operates to decrease the offset between the adjustment required for the idle and main fuel metering circuits to thereby minimize the aforementioned lean excursion by limiting the bleeding of air into the air and fuel mixture upstream of the exhaust gas sensor only when the idle fuel metering circuit is operating. When the adjustment of the air-fuel ratio in the lean direction in response to a substantially rich mixture provided by the idle fuel metering circuit attains a predetermined value, air is supplied to the air and fuel mixture so as to increase the ratio to thereby decrease the value of the controller adjustment in the lean direction to a value nearer to that required to adjust the main fuel metering circuit to the predetermined air and fuel ratio. Thereafter, when operation shifts from the idle to main fuel metering circuit, the air supply is terminated and the adjustment of the main fuel metering circuit is substantially as required.

It is the general object of this invention to provide for a closed loop air and fuel ratio controller whose control authority in the lean direction is effectively increased when the control adjustment approaches the lean adjustment authority limit.

It is another object of this invention to provide for a closed loop air-fuel ratio controller wherein the adjustment of the air-fuel mixture forming assembly in the lean direction is decreased when the adjustment attains a predetermined maximum value by bleeding air into the air-fuel mixture downstream of the mixture forming assembly.

It is another object of this invention to provide for a closed loop air-fuel ratio controller for adjusting the main and idle fuel metering circuits of a carburetor wherein the difference between the controller adjustments required to adjust the main and idle fuel metering circuits is reduced.

It is another object of this invention to provide for a system in accord with the foregoing objects wherein the value of the lean adjustment is decreased when the lean adjustment attains a predetermined magnitude by adding air to the air and fuel mixture at a point upstream of an exhaust gas sensor and independent of the air and fuel mixture forming device.

The invention may be best understood by reference to the following description of the invention and the drawings in which:

FIG. 1 illustrates an internal combustion engine incorporating a control system in accord with this invention;

FIG. 2 is a diagram of one embodiment of the control system of FIG. 1 for controlling the air and fuel ratio and the air bleed in accord with the principles of this invention;

Figure 3:
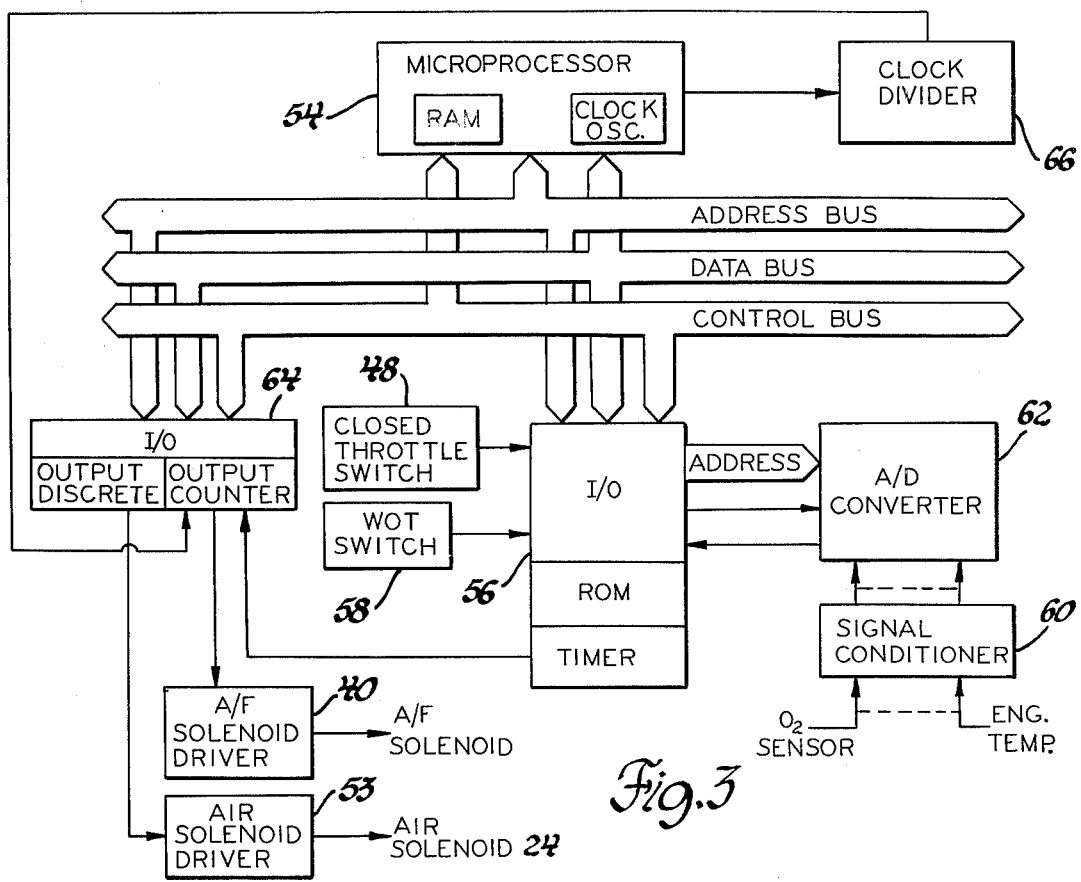
FIG. 3 illustrates a digital computer for controlling the air and fuel ratio and the air bleed in accord with the principles of this invention.

Referring to FIG. 1, an internal combustion engine 10 is supplied with a controlled mixture of fuel and air by a carburetor 12. Fuel is supplied to the carburetor 12 via a conventional fuel container and pump means (not illustrated) and air is supplied to the carburetor 12 via an air cleaner 14.

The air and fuel mixture supplied by the carburetor 12 to the engine 10 forms a combustible mixture that is drawn into the intake manifold 13 and thereafter into the respective cylinders and burned. The combustion byproducts from the engine 10 are exhausted to the atmosphere through an exhaust conduit 16, which includes a three-way catalytic converter 18 which simultaneously converts carbon monoxide, hydrocarbons and nitrogen oxides if the air/fuel mixture supplied thereto is maintained near the stoichiometric value.

The carburetor 12 is of the conventional type which includes an idle fuel metering circuit and a main fuel metering circuit, each of which is independently operable to supply an air and fuel mixture during the idle and off-idle operating modes, respectively, of the engine 10. However, it is difficult to provide a carburetor which has the desired response to the fuel determining input parameters over the full range of engine operating conditions. Additionally, these systems are generaly incapable of compensating for various ambient conditions and fuel variations, particularly to the degree required in order to maintain the air/fuel mixture within the required narrow range at stoichiometry to obtain three-way catalytic conversion. Consequently, the air-fuel ratio provided by the carburetor 12 in response to its fuel determining input parameters may deviate from stoichiometry during engine operation. Further, it is difficult to calibrate each of the independent fuel metering circuits (idle and main) so as to provide a mixture having the same air-fuel ratio during engine idle and off-idle operations. This is particularly so during cold engine operation wherein the idle fuel metering circuit typically provides a substantially rich mixture to the intake manifold 13.

To provide for the control of the air-fuel ratio of the mixture supplied by the carburetor 12 to the engine 10 so as to obtain the desired converter conversion characteristics, an oxygen sensor 20 is provided that senses the oxidizing/reducing conditions of the exhaust gases upstream from the catalytic converter 18. As illustrated in FIG. 1, the oxygen sensor 20 is positioned at the discharge point of one of the exhaust manifolds of the engine 10 and senses the exhaust discharge therefrom. The sensor 20 is preferably of the zirconia type which generates an output voltage that achieves its maximum value when exposed to rich air/fuel mixtures and its minimum value when exposed to lean air/fuel mixtures. Additionally, the output voltage from the sensor 20 exhibits an abrupt change between the high and low values as the air-fuel ratio of the mixture passes through the stoichiometric value.

The output of the sensor 20 is coupled to the input of a control system 22 which generates a control signal which varies in amount and sense tending to restore the air-fuel ratio of the mixture supplied to the engine 10 by the carburetor 12 to the desired air-fuel ratio which, in the present embodiment, is the stoichiometric value. The carburetor 12 includes an air-fuel ratio adjustment device that is responsive to the control signal output of the control circuit 22 to adjust the air-fuel ratio of the mixture supplied by each of the idle and main fuel metering circuits.

Additionally, the control system 22 functions as hereinafter described to energize a solenoid valve 24 to couple air from the air cleaner 14 directly to the manifold 13 via a conduit 26. The air entering the manifold 13 through the conduit 26 bypasses the carburetor 12 so as to effectively increase the air-fuel ratio of the mixture that is drawn into the cylinders of the engine 10.

Referring to FIG. 2, one embodiment of the control system 22 of FIG. 1 is illustrated. The output signal of the oxygen sensor 20 is coupled to the positive input of a comparator switch 28 which compares the sensor signal with a reference voltage provided to its negative input. The reference voltage has a value between the upper and lower saturation voltage levels of the oxygen sensor 20 and is substantially equal to the sensor voltage when the sensed air-fuel ratio of the exhaust gases is the stoichiometric value. The comparator switch 28 provides an output signal which shifts abruptly between a constant low voltage level when the output of the sensor 20 represents an air-fuel ratio greater than the stoichiometric value and a constant high voltage level when the output of the sensor 20 represents an air-fuel ratio less than the stoichiometric value.

While in another embodiment the control system 22 may employ only an integral controller, the present embodiment employs both an integral plus proportional correction term which is in the form of a step-plus ramp function generated in response to the two level output of the comparator switch 28 and which is effective to control the average air-fuel ratio of the mixture supplied by the metering circuits of the carburetor 12 to the stoichiometric ratio.

The proportional term is provided by an amplifier 30. The output of the comparator switch 28 is coupled to the negative input of the amplifier 30 and a reference voltage intermediate the upper and lower values of the comparator switch 28 output is supplied to the positive input. The output of the amplifier 30 comprises a two level proportional correction signal that shifts in the positive direction when the output of the comparator switch 28 shifts to its low level in response to a sensed lean air-fuel ratio and shifts in the negative direction in response to the output of the comparator switch 28 shifting to its positive level representing a sensed rich air-fuel ratio. The output of the amplifier 30 is coupled to a positive input of a summer 32.

The integral correction term is provided by an integrator 34 which includes a limiter circuit 35 that limits the upper and lower values of the output signal from the integrator 34. The output of the comparator switch 28 is coupled to the negative input of the integrator 34 and a reference voltage intermediate the output levels of the comparator switch 28 is coupled to the positive input. When the output of the comparator switch 28 is at its upper value representing a sensed rich air-fuel ratio, the output of the integrator 34 decreases in the negative direction with a constant slope determined by the integrating time constant. When the output of the comparator 28 is at its lower value representing a sensed lean air-fuel ratio, the output of the integrator 34 increases in the positive direction with a constant slope determined by the integrating time constant. The limiter 35 functions to limit the output of the integrator 34 to predetermined maximum and minimum values. The output integral correction term from the integrator 34 in the form of positive or negative going ramp signals is coupled to a second positive input of the summer 32.

The summer 32 sums the proportional and integral correction terms and provides a net closed loop correction signal which is coupled to a duty cycle oscillator formed by a comparator switch 36 and a triangle wave generator 38. The output of the triangle wave generator 38 is coupled to the positive input of the comparator switch 36 and the output of the summer 32 is coupled to its negative input.

The output of the comparator switch 36 is a pulsed width modulated signal at the frequency of the triangular wave output of the triangle wave generator 38. The pulse width modulated signal has a duty cycle that is inversely proportional to the amplitude of the control signal. For example, with an increasing value of the closed loop control signal output of the summer 32, the duty cycle approaches zero per cent and with decreasing levels of the output of the summer 32, the duty cycle approaches 100 percent. In one embodiment, the frequency of the triangle wave generator 38 may be 10 hz. so that the output of the comparator switch 36 is a pulse width modulated signal at a frequency of 10 hz.

The pulse width modulated signal output of the comparator switch 36 is coupled to an air/fuel solenoid driver circuit 40 which provides a pulse width modulated drive signal in accord with the output of the comparator 26 to the carburetor 12 to effect adjustment of the air-fuel ratio supplied by both the idle and main fuel metering circuits. In this respect, a low duty cycle output of duty cycle oscillator provides for an enrichment of the mixture supplied by the carburetor 12 while a high duty cycle is effective to provide a lean air-fuel ratio.

An example of a carburetor 12 with a controller responsive to a duty cycle signal for adjusting the mixture supplied by both the idle and main fuel metering circuits is illustrated in the U.S. Pat. Application Ser. No. 869,454, filed Jan. 16, 1978, which is assigned to the assignee of this invention. In this application, the duty cycle modulated control signal is applied to a solenoid which simultaneously adjusts elements in the idle and main fuel metering circuits to provide for air-fuel ratio adjustments. Consequently, when the engine is operating at idle and the carburetor idle metering circuit is functioning to control the air/fuel mixture, the output of the duty cycle oscillator functions to adjust the air-fuel ratio provided by the idle metering circuit. Conversely, when the vehicle is operating off idle, the duty cycle signal is effective for adjustment of the main fuel metering circuit to provide for air-fuel ratio control.

In general, the duty cycle of the output signal of the comparator switch 36 and consequently the signal to the carburetor 12 may, for illustrative purposes, vary between 5 and 95 percent as limited by the limits of the integrator 34, an increasing duty cycle effecting a decreasing fuel flow to increase the air-fuel ratio and a decreasing duty cycle effecting an increase in the fuel flow to decrease the air-fuel ratio. The range of duty cycle from 5 to 95 per cent may represent the change in four air-fuel ratios at the carburetor 12 of FIG. 1. The duty cycle limits of 5 and 95 percent in conjunction with the adjustment device in the carburetor 10 define the authority limits of the closed loop control system.

As a result of the time delay involved in the induction, combustion and exhaust processes and the switching characteristic of the sensor 20, the closed loop system limit cycles with the amplitude and frequency of the oscillations of the limit cycles being determined by the time constants of the control system and the delay times.

Characteristic of carburetors such as the carburetor 12, the idle fuel metering circuit may provide a substantially rich air-fuel ratio when the engine 10 is cold. This rich mixture may be substantially richer than the mixture provided by the main fuel metering circuit under the same engine operating conditions. During operation of the idle fuel metering circuit under these conditions, the closed loop control system 22 responds to the sensed rich air-fuel ratio to decrease the output of the closed loop control signal at the output of the summer 32 and consequently increase the duty cycle output of the comparator 36 in order to adjust the air-fuel ratio to the stoichiometric value. However, if the mixture provided by the idle circuit is substantially rich, the output of the comparator 36 may approach the limit duty cycle which, for example, may be 95 percent. When this limit is reached, the system is incapable of closed loop control to maintain a stoichiometric air-fuel ratio. Further, under the condition wherein operation of the idle circuit results in a high duty cycle output of the comparator 36, a shift in the operation of the carburetor from its idle to its main fuel metering circuits results in a lean excursion in air-fuel ratio as a result of the high duty cycle control input to the main fuel metering circuit adjustment element. This lean excursion exists until the closed loop control system functions to sense the lean air-fuel ratio and increases the output of the integrator 34 until a stoichiometric mixture is supplied by the main fuel metering circuit. This lean air-fuel ratio excursion may result in undesirable engine performance.

In order to prevent the closed loop controller from attaining its maximum adjustment authority in the lean direction and further to provide for a reduction in the lean air-fuel ratio excursion resulting from the difference between the air-fuel ratios provided by the idle and main fuel metering circuits, the subject invention provides for the addition of air to the air and fuel mixture during idle and when the amount of adjustment of the air-fuel ratio in the lean direction attains a predetermined value at a point upstream of the exhaust gas sensor 20 and independent of the carburetor 12 so as to lean the air/fuel mixture sensed by the sensor 20. The resulting sensed increase in the air-fuel ratio results in a decrease in the duty cycle of the signal to the carburetor 12. This effectively increases the lean authority limit of the closed loop control system and further functions to decrease the duty cycle output of the comparator 36 to a value that is substantially closer to the required duty cycle to maintain a stoichiometric mixture during operation of the main fuel metering circuit.

Again referring to FIG. 2, the output of the summer 32 is coupled to a filter 42 which provides an average value of the closed loop control signal output of the summer 32. The time constant of the filter 42 is large so as to substantially filter out the limit cycle excursions of the control signal. This average signal is coupled to the negative input of a comparator 44 where it is compared with a reference voltage. The comparator 44 has switch point hysteresis provided by a positive feedback resistor 45.

The magnitude of the reference voltage is equal to the output of the summer 32 producing a duty cycle output of the comparator 36 representing a predetermined lean adjustment such as 80 per cent duty cycle. This value is representative of a duty cycle indicative of the output of the comparator approaching the lean authority limit of the control system, which is 95 percent in this embodiment. When the output of the filter 42 decreases to below this reference, the output of the comparator switch 44 shifts to a positive voltage level.

The output of the comparator 44 is applied to one input of a logic AND gate 46. A second input is provided to the logic AND gate 46 that represents the state of the operation of the idle fuel metering circuit of the carburetor 12. This signal is provided by a throttle switch 48 operated by a throttle operator 50 which closes the throttle switch 48 when the carburetor throttle is closed and an inverter 52 which provides a positive signal to the second input of the logical AND gate 46 during operation of the idle fuel metering circuit.

When both of the conditions representing operation of the idle fuel metering circuit and the closed loop control signal approaching the lean authority limit occur, the output of the AND gate 46 shifts to a logic 1 level to energize the air solenoid 24 of FIG. 1 via an air solenoid driver circuit 53 to couple air from the air cleaner 14 into the intake manifold 13. This added air increases the air-fuel ratio of the mixture entering the combustion chambers and is thereafter sensed by the oxygen sensor 20. The closed loop system 22 responds to the output of the sensor 20 to decrease the duty cycle input to the carburetor 12 until a stoichiometric value is again attained. The amount of air admitted to the intake manifold is limited to a value that is determined to reduce the duty cycle output of the closed loop circuit by a predetermined amount. For example, the amount of air metered into the intake manifold may be determined to reduce the duty cycle output of the control system 22 by 30 percent thereby resulting in a duty cycle output of approximately 50 percent to maintain a stoichiometric ratio.

In the foregoing manner, the control authority of the closed loop controller 22 is effectively increased in the lean direction so as to maintain closed loop operation and prevent the controller from operating at the maximum lean adjustment authority limit during cold engine operation of the idle fuel metering circuit. Further, when the operation shifts from the idle fuel metering circuit to the main fuel metering circuit, the duty cycle output of the control system 22 is substantially at the duty cycle required to maintain the main fuel metering circuit at the stoichiometric value. Upon the transition to the main fuel metering circuit, the closed throttle switch 48 is opened to terminate the output of the inverter 52 and deenergize the air solenoid 26.

The comparator 44 includes hysteresis so that its output remains at the high voltage level even though the output of the filter 42 increases to a value above the reference supplied to the positive input. The amount of hysteresis is selected so that the comparator 44 again shifts to its low level output when the output of the summer 32 increases to a value producing a duty cycle at the output of the comparator 36 of approximately 30 percent. Consequently, as the engine warms up, and the air-fuel ratio of the mixture supplied by the idle fuel metering circuit increases, the air solenoid 24 is deenergized when the duty cycle output of the control system 22 decreases to 30 percent. Thereafter, the air solenoid 24 is maintained deenergized.

While the foregoing invention is described in conjunction with the use of a throttle switch for controlling the air solenoid 24, the throttle switch may be eliminated and the air solenoid 24 controlled solely as a function of the magnitude of the control signal output of the closed loop control system 22. In this respect, the system may operate to bleed air into the intake manifold whenever the duty cycle output of the control circuit attains the reference value. In this manner, the closed loop control circuit is prevented from operating at the lean authority limit.

The circuit as illustrated in FIG. 2 is essentially an analog circuit. However, the invention contemplates the implementation of a digital computer such as illustrated in FIG. 3.

Referring to FIG. 3, the digital system includes a microprocessor 54 that controls the operation of the closed loop carburetor 12 by executing an operating program which is stored in an external read-only memory (ROM). The microprocessor 54 may take the form of a combination module which includes a random access memory (RAM) and a clock oscillator in addition to the conventional counters, registers, accumulators, etc. Such a microprocessor combination module may take the form of a Motorola microprocessor MC6802. Alternatively, the microprocessor 54 may take the form of a microprocessor which utilizes an external RAM and clock oscillator.

The microprocessor 54 controls the carburetor 12 by executing an operating program stored in a ROM section of a combination module 56. The combination module 56 also includes an input/output interface and a programmable timer. The combination module may take the form of a Motorola MC 6846 combination module. Alternatively, the digital system may include separate input/output interface modules in addition to an external separate ROM and timer.

The input conditions upon which the control of air-fuel ratio are based are provided to the input/output interface of the combination circuit 56. The discrete inputs such as the output of the closed throttle switch 48 and the output of a wide-open throttle switch 58 are coupled to discrete inputs of the input/output interface of the combination circuit 56. The analog signals such as the output of the oxygen sensor 20 and engine temperature are provided to a signal conditioner 60 whose outputs are coupled to an analog-to-digital converter-multiplexer 62. The particular analog condition to be sampled and converted are controlled by the microprocessor 54 via address lines from the input/output interface of the combination circuit 56. Upon command, the addressed condition is converted to digital form and supplied to the input/output interface of the combination circuit 56.

The output of the digital system for controlling the air/fuel solenoid driver 40 and the air solenoid driver 53 are provided by a conventional input/output interface circuit 64 which includes an output counter for providing the duty cycle modulated signal to the air/fuel solenoid driver 40 and an output discrete which controls the air solenoid driver 53. The output counter of the input/output interface circuit 64 receives a clock signal from a clock divider 66 and a 10 hz. signal from the timer in the combination circuit 56.

The microprocessor 54, the combination module 56 and the input/output interface circuit 64 are interconnected by an address bus, a data bus and a control bus. The microprocessor 54 accesses the various circuits and memory location in the ROM via the address bus. Information is transmitted between the circuits via the data bus and the control bus includes lines such as read/write lines, reset lines, clock lines, etc.

As previously indicated, the microprocessor 54 reads data and controls the operation of the closed loop carburetor 12 and the air injection solenoid 24 by execution of its operating program as provided by the ROM in the combination circuit 56. Under control of the program, the various input signals are read and stored in designated locations in the RAM in the microprocessor 54 and the calculations are performed for controlling the air-fuel ratio. The determined control values such as the duty cycle value are outputted to the respective solenoid drivers via the input/output device 64.

Figure 4:
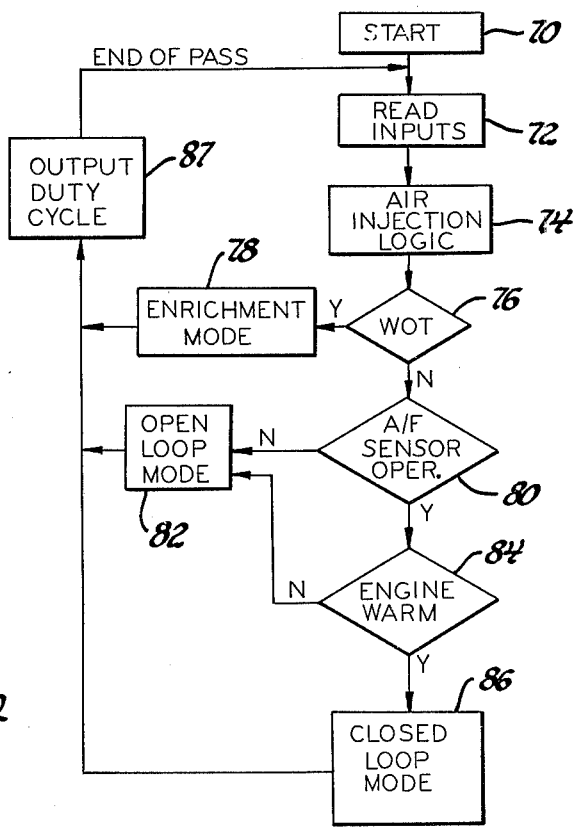
FIGS. 4, 5 and 6 are flow diagrams illustrative of the operation of the digital computer of FIG. 3.

FIG. 4 is an overall flow diagram of the program of the digital computer of FIG. 3. The computer program is entered at point 70 and is reexecuted at a frequency of 10 hz. as determined by the timer portion of the combination module 56. At step 72 in the program, the computer executes a read routine wherein the discrete inputs from the closed throttle switch 48 and the wide open throttle switch 58 are stored in respective locations in the RAM and the various inputs to the analog-to-digital converter including the $O_2$ sensor signal and the engine temperature signal are one by one converted by the analog-to-digital converter-multiplexer 62 into a pulse width which is in turn converted via a counter in the combination circuit 56 into a binary number representative of the value of the analog signal. This binary signal is then read into the RAM in the microprocessor 54 via the data bus. The microprocessor 54 also retains in the RAM the prior state of the throttle switch 48 and the prior state of the oxygen sensor 20. The program then proceeds to step 74 where the air injection logic is implemented in accord with the present invention. If the conditions are met for energizing the air solenoid 24, an output discrete is caused to be issued from the input/output interface circuit 64 to the air solenoid driver 53 to provide for air bleed from the air cleaner 14 into the intake manifold 13. Conversely, if the conditions are met for terminating the air bleed into the intake manifold 13, the discrete output of the input/output interface circuit 64 is terminated to deenergize the air solenoid 24.

The program cycle next proceeds to a decision point 76 at which the digital computer determines whether the engine is operating at wide open throttle thereby requiring fuel enrichment. This is accomplished by sampling the address location in the random access memory 54 at which the condition of the wide open throttle switch 58 was stored during step 72. If the engine is at wide open throttle, the program cycle proceeds to step 78 at which an enrichment routine is executed wherein the width of the pulse width modulated signal required to control the carburetor 12 for power enrichment is determined.

If the engine is not operating at wide open throttle, the program cycle proceeds to decision point 80 at which the computer determines whether the air-fuel ratio sensor 20 is operational. In this respect, the digital system may determine operation of the sensor 20 by parameters such as elapsed time from power up, sensor temperature or sensor impedance. If the air/fuel sensor 20 is not operational, the program proceeds to step 82 at which an open loop routine is executed at which an open loop pulse width is calculated in accord with input parameters which may include the engine temperature read and stored in the RAM at program step 72.

If the air-fuel ratio sensor 20 is operational, the program cycle proceeds to decision point 84 at which the computer determines whether the engine temperature stored at step 72 is greater than a predetermined value. If the temperature of the engine is below the predetermined value, the computer cycle proceeds to the step 82 and executes the open loop routine as previously described.

If the engine temperature is greater than the predetermined level, the program cycle proceeds to step 86 where the computer executes a closed loop routine to determine the carburetor control signal pulse width in accord with the sensed air-fuel ratio.

From each program step 78, 82 and 86, the program cycle proceeds to step 87 at which the calculated output pulse width in the form of a binary number is entered into the output counter of the input/output circuit 64. A pulse is then issued by the input/output circuit 64 having a duration determined by the number in the output counter. The pulse width in conjunction with the computer program cycle rate (10 hz. in this embodiment) defines a variable duty cycle control signal such as provided in the system of FIG. 2.

Figure 5:
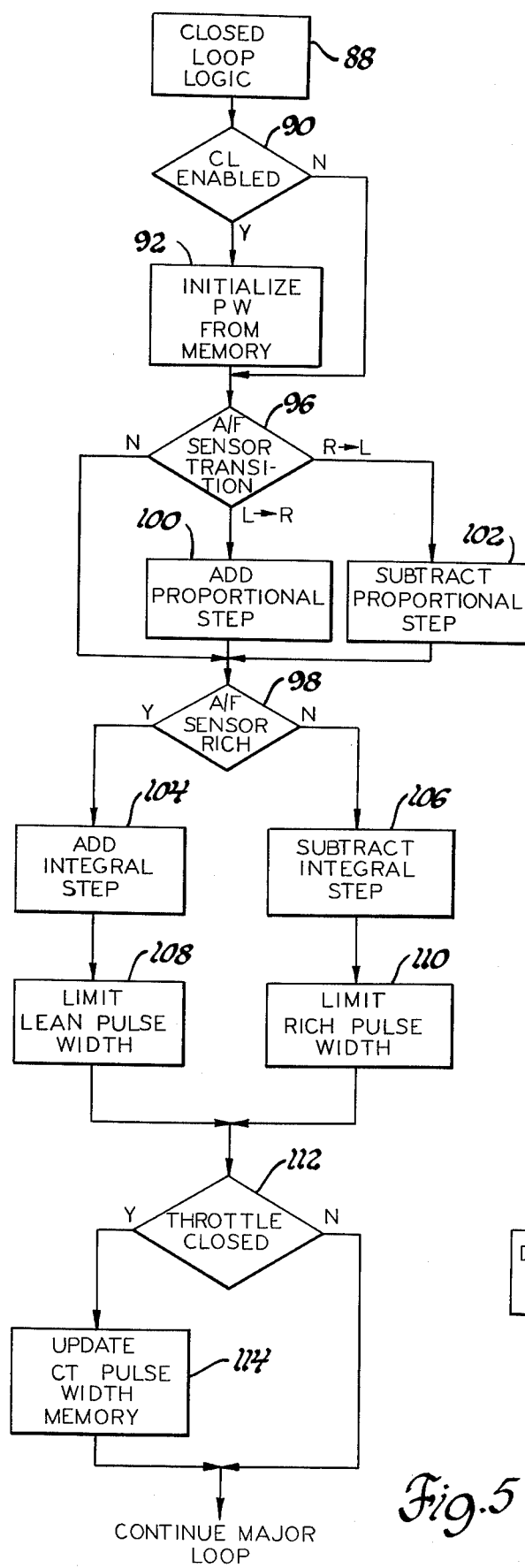

Referring to FIG. 5, there is illustrated a diagram of the program steps performed at step 86 in the program cycle wherein the closed loop routine is executed. At step 88, the program cycle enters the closed loop mode and then proceeds to decision point 90 where a determination is made as to whether the closed loop mode has just been enabled after executing an enrichment or open loop routine at steps 78 or 82 in the prior program cycle. If the closed loop mode has just been enabled, the program cycle proceeds to step 92 where the calculated closed loop pulse width is initialized to a constant value stored at a respective memory location in the RAM.

After step 92 or if at decision point 90 in the program cycle the closed loop routine at step 86 was executed during the previous program cycle, the program cycle proceeds to decision point 96 where it is determined if the oxygen sensor has made a transition requiring the proportional step in the closed loop pulse width.

At decision point 96 the condition of the output of the oxygen sensor 20 is determined. The computer determines if there has been an air-fuel ratio sensor transition from rich to lean or from lean to rich since the previous program cycle as determined from the prior and current state of the oxygen sensor output stored in the RAM in the microprocessor 54. If no transition of the oxygen sensor 20 is detected, no proportional step is required and the program cycle proceeds to decision point 98. If it is determined that a transition has been made a proportional step in the calculated pulse width is provided. If the transition was from lean to rich, the program cycle proceeds to step 100 wherein a predetermined proportional term value stored in the ROM is added to the previously calculated closed loop pulse width. If the transition was from rich to lean, the program cycle proceeds to step 102 wherein a predetermined proportional term value stored in the ROM is subtracted from the previously determined closed loop pulse width.

From either of the steps 100 or 102, the program cycle proceeds to decision point 98 where the state of the oxygen sensor 20 as stored in the RAM during step 72 is determined. If the sensor state represents a rich air-fuel ratio the closed loop pulse width value is increased by a predetermined amount. If it is determined that the air-fuel ratio is not rich, the closed loop pulse width value is decreased by a predetermined amount. The steps 104 and 106 provide for the integral term portion of the closed loop pulse width signal which is repeated at the frequency of the program cycle (10 hz.).

The maximum value of the closed loop pulse width resulting from step 104 in the program cycle is limited at step 108 to a maximum value resulting in a duty cycle value such as 95 percent. Similarly, the lower value of the pulse width determined at step 106 in the program cycle is limited at step 110 to a minimum value resulting in a duty cycle value such as 5 percent.

The resulting calculated pulse width after steps 108 or 110 comprises the closed loop pulse width or duty cycle signal consisting of proportional and integral correction terms in the form of step and ramp functions for adjusting the carburetor 12 in a direction tending to produce a stoichiometric mixture.

After steps 108 or 110, the program cycle proceeds to decision point 112 where the state of the throttle switch 48 stored in the RAM of the microprocessor 54 at step 72 is determined. If the throttle switch 48 is closed, a calculated average value of the closed throttle closed loop pulse width that is stored in a respective memory location in the RAM is updated in accord with the closed loop pulse width determined during the present program cycle.

The updated or average closed throttle pulse width stored in the RAM during step 114 in the program cycle is utilized in conjunction with the controlling of the air solenoid 24 of FIG. 1 in accord with this invention.

While the averaging technique for providing the updated closed throttle pulse width in program step 114 may take any desired form, the averaging routine in program step 114 may take the form of the expression:

NEW MEMORY VALUE=OLD MEMORY VALUE+ [(NEW PULSE WIDTH—OLD MEMORY VALUE) (WEIGHTING FACTOR)].

This expression is implemented in accord with the program sequence stored in the ROM in the combination circuit 56.

After program cycle step 114 or if the throttle is open, the system continues the major loop and proceeds to program step 87 wherein the calculated pulse width is entered into the output counter in the input/output circuit 64 via the data bus. The air-fuel ratio control solenoid in the carburetor 12 is energized for a duration in accord with this value. The foregoing closed loop routine is repeated at a 10 hz. rate to provide duty cycle control of the carburetor so as to maintain a stoichiometric mixture.

Figure 6:
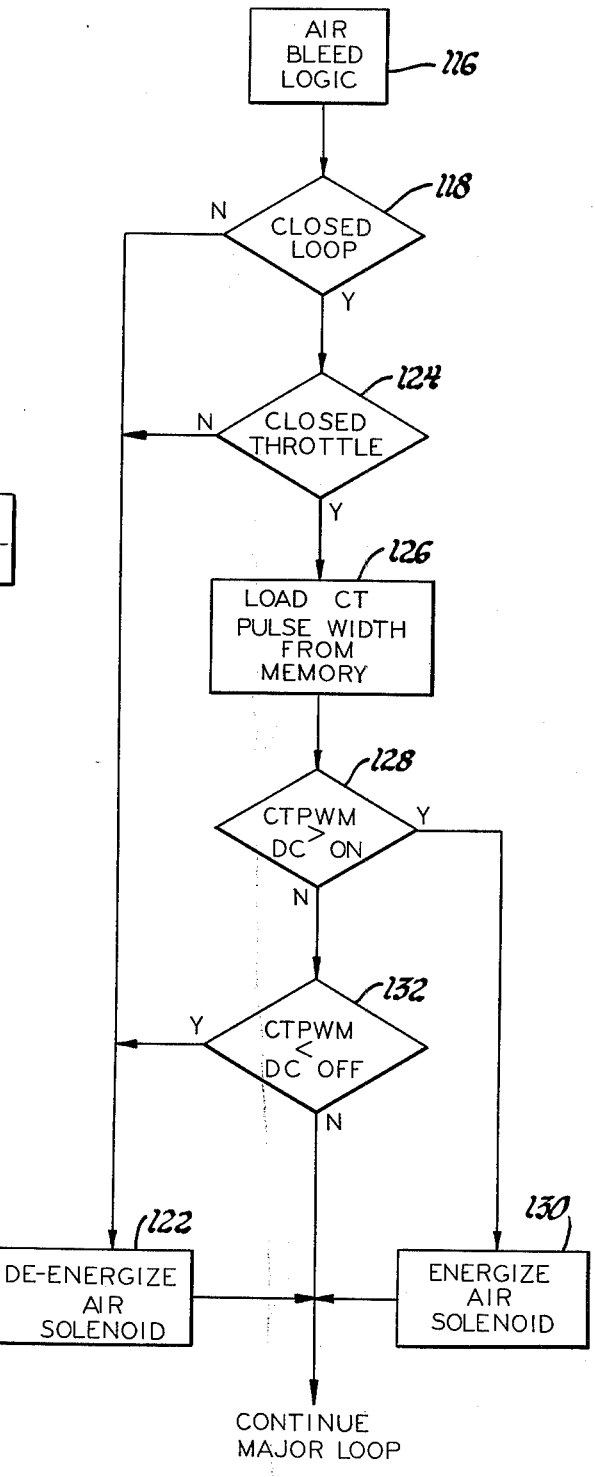

The diagram of FIG. 6 illustrates the control of the air solenoid 24 in accord with this invention. When the computer program cycle reaches step 74, the air bleed routine is entered at point 116 and proceeds to decision point 118 where the system first determines whether the system is operating in closed loop. If the system is not operating closed loop, the program proceeds to step 122 wherein the output discrete from the input/output circuit 64 is set to its low level to deenergize the air solenoid 24 to prevent air bleed into the manifold 13 during the system open loop mode operation. After step 122, the program cycle continues with the major loop of FIG. 4.

If the system is operating in its closed loop mode, the program cycle proceeds to decision point 124 where the state of the throttle switch 48 stored in the RAM at step 72 is determined. If the throttle switch is open, the program again proceeds to step 122 to deenergize the air solenoid 24 as previously described to prevent air bleed into the manifold 13 during operation of the main fuel metering circuit of the carburetor 12.

If the throttle switch 48 is closed, the program cycle proceeds to step 126 wherein the average value of the closed throttle pulse width stored in the RAM at program cycle step 114 in FIG. 5 is loaded into the microprocessor accumulator. The program cycle then proceeds to decision point 128 where the average pulse width value loaded into the accumulator is compared with a constant value DCON stored in the ROM and which represents a lean adjustment approaching the maximum lean authority of the closed loop controller. The value DCON may represent an 80 percent duty cycle in one embodiment. If the average closed throttle pulse width is greater than DCON the program cycle proceeds to step 130 where the microprocessor 54 causes the input/output circuit 64 to issue an output discrete to the air solenoid driver 53 to energize the air solenoid 24. Thereafter, the program cycle continues with the major loop in FIG. 4.

As described with reference to FIG. 2, the controller responds to the resulting increased air-fuel ratio and decreases the closed loop duty cycle to thereby affect an increase in the lean authority limit of the closed loop controller and further to provide for a closed loop duty cycle in closed throttle operation required to maintain a stoichiometric mixture which more closely matches the duty cycle required to provide a stoichiometric mixture during operation at partthrottle.

If the average closed throttle pulse width is less than DCON, the program cycle proceeds to decision point 132 where a comparison is made between the average pulse width value loaded into the accumulator at program cycle step 126 and a constant value DCOFF stored in the ROM and which represents a predetermined closed loop pulse width at which the air valve 26 is to be deenergized. This valve provides for the hysteresis described with respect to FIG. 2. If the average closed loop pulse width has decreased to a value less than DCOFF, the program cycle then proceeds to the step 122 to deenergize the air solenoid as previously described. However, if the average closed loop pulse width is greater than DCOFF representing an average closed loop pulse width between the values DCON and DCOFF, the program cycle continues with the major loop of FIG. 4 and the output discrete from the input/output circuit 64 is unaltered as is the energized state of the air solenoid 24.

The computer system illustrated in FIGS. 3 through 6 controls the air solenoid 24 in the same manner as the circuit illustrated in FIG. 2 to prevent the closed loop control from operating at its maximum adjustment authority in the lean direction and to provide a closed loop duty cycle control value during operation of the idle fuel metering circuit that more closely matches the required closed loop duty cycle control value during operation of the main fuel metering circuit.

The air solenoid 24 may also be energized to bleed air into the intake manifold 13 during other engine operating conditions. For example, the solenoid 24 may be energized when the engine speed exceeds a predetermined value while the throttle is closed so as to increase the air-fuel ratio.

The foregoing description of the invention for the purpose of illustrating the principles thereof is not to be considered as limiting or restricting the invention since many modifications may be made by the exercise of one skilled in the art without departing from the scope of the invention.

The embodiments of the invention in which an exclusive property or privilege is claimed are defined as follows:

1. An air/fuel mixture control system for an internal combustion engine having combustion space into which an air/fuel mixture is supplied to undergo combustion and having means defining an exhaust gas passage from the combustion space into which spent combustion gases are discharged, comprising, in combination:

an air/fuel mixture forming assembly effective to supply an air and fuel mixture to the combustion space, the air-fuel ratio of said mixture being substantially less than a predetermined ratio during certain engine operating conditions;

a sensor effective to monitor the exhaust gases in the exhaust gas passage and provide a sensor signal representing at least the sense of deviation of the air-fuel ratio from the predetermined ratio;

a controller responsive to the sensor signal effective to adjust the air-fuel ratio supplied by the mixture forming assembly in amount between rich and lean control limits and direction tending to produce the predetermined air-fuel ratio;

air supply means effective to supply air to the air and fuel mixture upstream of the sensor and independent of the air-fuel mixture forming assembly; and means effective to enable the air supply means to supply air to the air and fuel mixture when the controller adjustment attains a predetermined amount in the mixture leaning direction in response to the sensed rich air-fuel ratio during said certain engine operating conditions to increase the air-fuel ratio to reduce the required controller adjustment of the air-fuel ratio in the leaning direction to thereby effectively increase the adjustment range of the controller in the mixture leaning direction, whereby the controller is prevented from operating at the lean limit in response to the rich air and fuel mixture supplied during said certain engine operating conditions.

2. An air-fuel mixture control system for an internal combustion engine having combustion space into which an air-fuel mixture is supplied to undergo combustion and having means defining an exhaust gas passage from the combustion space into which spent combustion gases are discharged comprising, in combination:

a carburetor effective to supply an air and fuel mixture to the combustion space, the carburetor having an idle fuel metering circuit and a main fuel metering circuit, the air-fuel ratio of the mixture supplied by the idle fuel metering circuit being richer than a predetermined ratio and richer than the ratio of the mixture supplied by the main fuel metering circuit during certain engine operating conditions;

a sensor effective to monitor the exhaust gases in the exhaust gas passage and provide a sensor signal representing at least the sense of deviation of the air-fuel ratio from the predetermined ratio;

a controller responsive to the sensor signal effective to adjust the air-fuel ratio supplied by the idle and main fuel metering circuits in amount between rich and lean control limits and direction tending to produce the predetermined air-fuel ratio;

air supply means effective to supply air to the air and fuel mixture upstream of the sensor and independent of the mixture supplied by the carburetor;

means effective to sense the operation of the idle fuel metering circuit; and means effective to enable the air supply means to supply air to the air and fuel mixture when both (1) the controller adjustment attains a predetermined amount in the mixture leaning direction in response to the sensed rich air-fuel ratio during said certain engine operating conditions and (2) when said last mentioned means senses operation of the idle fuel circuit, said supplied air increasing the air-fuel ratio to reduce the required controller adjustment of the air-fuel ratio in the leaning direction, whereby the controller adjustment of the idle fuel metering circuit more closely equals the adjustment of the main fuel metering circuit during said certain engine operating conditions to thereby substantially avoid a lean air-fuel ratio excursion during a shift in operation from the idle fuel metering circuit to the main fuel metering circuit.

3. An air/fuel mixture control system for an internal combustion engine having an intake plenum into which an air/fuel mixture is supplied, combustion space into which the intake plenum air fuel mixture is drawn to undergo combustion and means defining an exhaust gas passage from the combustion space into which spent combustion gases are discharged comprising, in combination:

a carburetor effective to supply an air and fuel mixture to the intake plenum, the carburetor having an idle fuel metering circuit operable during engine idle conditions and a main fuel metering circuit operable during engine offidle conditions, the air-fuel ratio of the mixture supplied by the idle fuel metering circuit being richer than a predetermined ratio and richer than the ratio of the mixture supplied by the main fuel metering circuit during certain engine operating conditions;

a sensor effective to monitor the exhaust gases in the exhaust gas passage and provide a sensor signal representing at least the sense of deviation of the air-fuel ratio from the predetermined ratio;

a controller responsive to the sensor signal effective to adjust the air-fuel ratio supplied by the idle and main fuel metering circuits in amount between rich and lean control limits and direction tending to produce the predetermined air-fuel ratio;

an air supply valve effective when energized to supply additional air to the intake plenum;

means effective to sense the operation of the idle fuel circuit; and means effective to energize the air supply valve to supply additional air to the intake plenum when both (1) the controller adjustment attains a predetermined amount in the mixture leaning direction in response to the sensed rich air-fuel ratio during said certain engine operating conditions and (2) when said last mentioned means senses operation of the idle fuel circuit, said supplied air increasing the air-fuel ratio of the mixture drawn into the combustion space to reduce the required controller adjustment of the air-fuel ratio in the leaning direction, whereby the controller adjustment of the idle fuel metering circuit more closely equals the adjustment of the main fuel metering circuit during said certain engine operating conditions to thereby substantially avoid a lean air-fuel ratio excursion during a shift in operation from the idle fuel metering circuit to the main fuel metering circuit.

* * * * *